United States Patent
Ai et al.

(10) Patent No.: US 10,708,581 B2
(45) Date of Patent: Jul. 7, 2020

(54) VIDEO FRAME DECODING METHOD AND APPARATUS

(71) Applicant: Huawei Technologies Co., Ltd., Shenzhen (CN)

(72) Inventors: Changquan Ai, Shenzhen (CN); Shaobo Zhang, Shenzhen (CN); Haitao Yang, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 216 days.

(21) Appl. No.: 15/071,269

(22) Filed: Mar. 16, 2016

(65) Prior Publication Data
US 2016/0277734 A1    Sep. 22, 2016

(30) Foreign Application Priority Data
Mar. 17, 2015   (CN) .......................... 2015 1 0115730

(51) Int. Cl.
*H04N 19/105*   (2014.01)
*H04N 19/23*    (2014.01)
(Continued)

(52) U.S. Cl.
CPC ......... *H04N 19/105* (2014.11); *H04N 19/172* (2014.11); *H04N 19/23* (2014.11);
(Continued)

(58) Field of Classification Search
CPC .... H04N 19/105; H04N 19/172; H04N 19/23; H04N 19/44; H04N 19/46; H04N 19/70; H04N 19/107
(Continued)

(56) References Cited

U.S. PATENT DOCUMENTS

| 7,817,576 | B1 | 10/2010 | Breau et al. | |
| 2006/0291807 | A1* | 12/2006 | Ryu | G11B 27/105 386/329 |
| 2010/0303154 | A1* | 12/2010 | Le Floch | H04N 19/105 375/240.16 |

FOREIGN PATENT DOCUMENTS

| CN | 102768834 A | 11/2012 |
| CN | 102868909 A | 1/2013 |

(Continued)

OTHER PUBLICATIONS

ISO/IEC, "Information Technology—Coding of Audio-Visual Objects—Part 12",4th Edition, ISO/IEC 14496-12, 2012.*
(Continued)

*Primary Examiner* — Frederick D Bailey
*Assistant Examiner* — Amir Shahnami
(74) *Attorney, Agent, or Firm* — Conley Rose, P.C.

(57) ABSTRACT

A video frame decoding method and apparatus in order to implement efficient and fast video decoding. The method includes acquiring a target time point of a video, obtaining a frame number of a corresponding random access frame according to the target time point, obtaining a frame number of a frame that can be independently decoded, where the dependency set includes at least one dependency, and the dependency represents a correspondence between a frame number of a random access frame and a frame number of a frame that can be independently decoded, and obtaining, according to the frame number of the frame that can be independently decoded, video data of the frame that can be independently decoded, and decoding the random access frame.

20 Claims, 5 Drawing Sheets

(51) Int. Cl.
| | |
|---|---|
| *H04N 19/70* | (2014.01) |
| *H04N 19/46* | (2014.01) |
| *H04N 19/172* | (2014.01) |
| *H04N 19/44* | (2014.01) |
| *H04N 19/107* | (2014.01) |

(52) U.S. Cl.
CPC ............ *H04N 19/44* (2014.11); *H04N 19/46* (2014.11); *H04N 19/70* (2014.11); *H04N 19/107* (2014.11)

(58) Field of Classification Search
USPC .................................................. 375/240.12
See application file for complete search history.

(56) References Cited

FOREIGN PATENT DOCUMENTS

| | | |
|---|---|---|
| CN | 103747065 A | 4/2014 |
| CN | 105142036 A | 12/2015 |

OTHER PUBLICATIONS

Boll et al., "Intelligent Prefetching and Buffering for Interactive Streaming of MPEG Videos"; Ulmer Informatikberichte Nr. 2000-05, Apr. 2000.*

Machine Translation and Abstract of Chinese Publication No. CN102768834, Nov. 7, 2012, 6 pages.

Machine Translation and Abstract of Chinese Publication No. CN102868909, Jan. 9, 2013, 11 pages.

Machine Translation and Abstract of Chinese Publication No. CN103747065, Apr. 23, 2014, 17 pages.

Machine Translation and Abstract of Chinese Publication No. CN105142036, Dec. 9, 2015, 9 pages.

Foreign Communication From a Counterpart Application, Chinese Application No. 201510115730.0, Chinese Office Action dated May 4, 2017, 8 pages.

Foreign Communication From a Counterpart Application, Chinese Application No. 201510115730.0, Chinese Search Report dated Apr. 25, 2017, 2 pages.

"Information technology—Coding of audio-visual objects—Part 12: ISO base media file format," ISO/IEC 14496-12, International Standard, Draft 4th Edition, May 8, 2012, 190 pages.

Wang, Y., et al., "File format—on RAP definition and signaling," ISO/IEC JTC1/SC29/WG11 MPEG2011/M19132, Jan. 17, 2011, 8 pages.

Singer, D., "Random Access in 14496-12, the ISO Base Media File Format," ISO/IEC JTC1/SC29/WG11 MPEG2011/m20109, Mar. 15, 2011, 10 pages.

"Information technology—Generic coding of moving pictures and associated audio information: Systems," International Standard, ISO/IEC 13818-1, Fifth Edition, Jul. 11, 2014, 244 pages.

"Information technology—Coding of audio-visual objects—Part 12: ISO base media file format," International Standard, ISO/IEC 14496-12, Second Edition, Apr. 1, 2005, 94 pages.

"Series H: Audiovisual and Multimedia Systems, Infrastructure of audiovisual services—Coding of moving video, Advanced video coding for generic audiovisual services," ITU-T, H.264, Feb. 2014, 790 pages.

Foreign Communication From a Counterpart Application, European Application No. 16159361.1, Extended European Search Report dated Jun. 8, 2016, 8 pages.

English Translation, "AVS3—Part 2: Video," ICS 35.040, National Standards of the People's Republic of China, Apr. 15, 2019, 333 pages.

* cited by examiner

VIDEO FRAME DECODING METHOD AND APPARATUS

CROSS-REFERENCE TO RELATED APPLICATIONS

This application claims priority to Chinese Patent Application No. 201510115730.0, filed on Mar. 17, 2015, which is incorporated herein by reference in its entirety.

TECHNICAL FIELD

Embodiments of the present disclosure relate to video technologies, and in particular, to a video frame decoding method and apparatus.

BACKGROUND

A video sequence is generally stored according to a specific frame structure. H.264 is used as an example, and a video frame structure of H.264 may be, for example, IPP . . . PP IPP . . . PPIPP . . . PP . . . , where an I frame (random access frame) is a frame that can be independently decoded, and a P frame (common frame) is a frame that cannot be independently decoded and decoding of the P frame needs to depend on an I frame before the P frame. When a video with such a frame structure is dragged to play or edited, an I frame corresponding to a target time point for dragging or editing needs to be found first.

Generally, in scenarios such as video surveillance and static observation and photography, a video background remains unchanged in a quite long time. Based on this characteristic, video encoding efficiency can be significantly improved using an optimized encoding technology. After the optimized encoding technology is used, a frame structure of a video sequence changes accordingly, including a background frame, a random access frame, and a common frame, where only the background frame can be independently decoded, and decoding of both the random access frame and a common frame needs to depend on the corresponding background frame. When a video with such a frame structure is dragged to play or edited, a random access frame corresponding to a target time point for dragging or editing may be found first. However, with only the random access frame, decoding cannot be performed, and all frames located before the random access frame need to be searched for in a traversal manner according to frame header data of the random access frame in order to determine a background frame on which decoding of the random access frame depends.

However, a traversal method is a searching method with extremely low efficiency, thereby severely reducing efficiency of decoding a video frame.

SUMMARY

Embodiments of the present disclosure provide a video frame decoding method and apparatus in order to implement efficient and fast video decoding.

According to a first aspect, an embodiment of the present disclosure provides a video frame decoding method, including acquiring a target time point of a video, obtaining a frame number of a corresponding random access frame according to the target time point, obtaining, according to a prestored dependency set and the frame number of the random access frame, a frame number of a frame that can be independently decoded, where the dependency set includes at least one dependency, the dependency represents a correspondence between a frame number of a random access frame and a frame number of a frame that can be independently decoded, and the frame that can be independently decoded is a frame on which decoding of the random access frame needs to depend, and obtaining, according to the frame number of the frame that can be independently decoded, video data of the frame that can be independently decoded, and decoding the random access frame according to the video data of the frame that can be independently decoded.

With reference to the first aspect, in a first possible implementation manner of the first aspect, the method further includes obtaining, according to the prestored dependency set and the frame number of the random access frame, the frame number of the frame that can be independently decoded, where the dependency set includes frame numbers of all frames, which can be independently decoded, of the video, and the obtained frame number of the frame that can be independently decoded is a frame number that is smaller than the frame number of the random access frame in the dependency set, where a difference between the frame number that can be independently decoded and the frame number of the random access frame is the smallest.

With reference to the first aspect or the first possible implementation manner of the first aspect, in a second possible implementation manner of the first aspect, the dependency set is prestored in the video, or the dependency set is prestored in an attached file of the video, and before the obtaining, according to a prestored dependency set and the frame number of the random access frame, a frame number of a frame that can be independently decoded, the method further includes acquiring the dependency set from the video or the attached file.

With reference to the first aspect or either of the first and the second possible implementation manners of the first aspect, in a third possible implementation manner of the first aspect, the video includes video index information and video data, and the video index information includes a correspondence between a time point of the video and a frame number of each frame of the video, frame numbers of all random access frames, and a correspondence between a frame number of a common frame in all the frames and a frame number of a random access frame, and the obtaining a frame number of a corresponding random access frame according to the target time point includes obtaining, according to the correspondence between a time point of the video and a frame number of each frame of the video, a frame number corresponding to the target time point, and if the frame number corresponding to the target time point is found in the frame numbers of all the random access frames, determining that the frame number of the random access frame corresponding to the target time point is the frame number corresponding to the target time point, or if the frame number corresponding to the target time point is not found in the frame numbers of all the random access frames, determining that the frame number corresponding to the target time point is a frame number of a common frame, and obtaining, according to the correspondence between a frame number of a common frame in all the frames and a frame number of a random access frame, the frame number of the random access frame corresponding to the target time point.

With reference to the third possible implementation manner of the first aspect, in a fourth possible implementation manner of the first aspect, the video index information further includes an index of video data corresponding to the frame number of each frame, and the obtaining, according to the frame number of the frame that can be independently decoded, video data of the frame that can be independently decoded includes querying the video index information according to the frame number of the frame that can be independently decoded, to obtain an index of the video data of the frame that can be independently decoded, and acquiring, according to the index, the video data of the frame that can be independently decoded.

According to a second aspect, an embodiment of the present disclosure provides a video frame decoding apparatus, including an acquiring module configured to acquire a target time point of a video, obtain a frame number of a corresponding random access frame according to the target time point, and obtain, according to a prestored dependency set and the frame number of the random access frame, a frame number of a frame that can be independently decoded, where the dependency set includes at least one dependency, the dependency represents a correspondence between a frame number of a random access frame and a frame number of a frame that can be independently decoded, and the frame that can be independently decoded is a frame on which decoding of the random access frame needs to depend, and a decoding module configured to obtain, according to the frame number of the frame that can be independently decoded, video data of the frame that can be independently decoded, and decode the random access frame according to the video data of the frame that can be independently decoded.

With reference to the second aspect, in a first possible implementation manner of the second aspect, the acquiring module is further configured to obtain, according to the prestored dependency set and the frame number of the random access frame, the frame number of the frame that can be independently decoded, where the dependency set includes frame numbers of all frames, which can be independently decoded, of the video, a quantity of all the frames that can be independently decoded is less than a quantity of all frames that are of the video and whose frame numbers are smaller than the frame number of the random access frame, and the obtained frame number of the frame that can be independently decoded is a frame number that is smaller than the frame number of the random access frame in the dependency set, where a difference between the frame number that can be independently decoded and the frame number of the random access frame is the smallest.

With reference to the second aspect or the first possible implementation manner of the second aspect, in a second possible implementation manner of the second aspect, the dependency set is prestored in the video, or the dependency set is prestored in an attached file of the video, and the acquiring module is further configured to acquire the dependency set from the video or the attached file.

With reference to the second aspect or either of the first and the second possible implementation manners of the second aspect, in a third possible implementation manner of the second aspect, the video includes video index information and video data, and the video index information includes a correspondence between a time point of the video and a frame number of each frame of the video, frame numbers of all random access frames, and a correspondence between a frame number of a common frame in all the frames and a frame number of a random access frame; and the acquiring module is further configured to obtain, according to the correspondence between a time point of the video and a frame number of each frame of the video, a frame number corresponding to the target time point, and if the frame number corresponding to the target time point is found in the frame numbers of all the random access frames, determine that the frame number of the random access frame corresponding to the target time point is the frame number corresponding to the target time point, or if the frame number corresponding to the target time point is not found in the frame numbers of all the random access frames, determine that the frame number corresponding to the target time point is a frame number of a common frame, and obtain, according to the correspondence between a frame number of a common frame in all the frames and a frame number of a random access frame, the frame number of the random access frame corresponding to the target time point.

With reference to the third possible implementation manner of the second aspect, in a fourth possible implementation manner of the second aspect, the video index information further includes an index of video data corresponding to the frame number of each frame, and the decoding module is further configured to query the video index information according to the frame number of the frame that can be independently decoded, to obtain an index of the video data of the frame that can be independently decoded, and acquire, according to the index, the video data of the frame that can be independently decoded.

According to the video frame decoding method and apparatus in the embodiments of the present disclosure, a dependency set is prestored, a frame number of a frame that can be independently decoded and on which decoding of a random access frame corresponding to a target time point needs to depend can be directly acquired according to the dependency set, and the random access frame is decoded using video data of the frame that can be independently decoded, which implements efficient and fast video decoding.

BRIEF DESCRIPTION OF DRAWINGS

To describe the technical solutions in the embodiments of the present disclosure or in the prior art more clearly, the following briefly introduces the accompanying drawings required for describing the embodiments or the prior art. The accompanying drawings in the following description show some embodiments of the present disclosure, and persons of ordinary skill in the art may still derive other drawings from these accompanying drawings without creative efforts.

DESCRIPTION OF EMBODIMENTS

To make the objectives, technical solutions, and advantages of the embodiments of the present disclosure clearer, the following clearly describes the technical solutions in the embodiments of the present disclosure with reference to the accompanying drawings in the embodiments of the present disclosure. The described embodiments are some but not all of the embodiments of the present disclosure. All other embodiments obtained by persons of ordinary skill in the art based on the embodiments of the present disclosure without creative efforts shall fall within the protection scope of the present disclosure.

Figure 1:
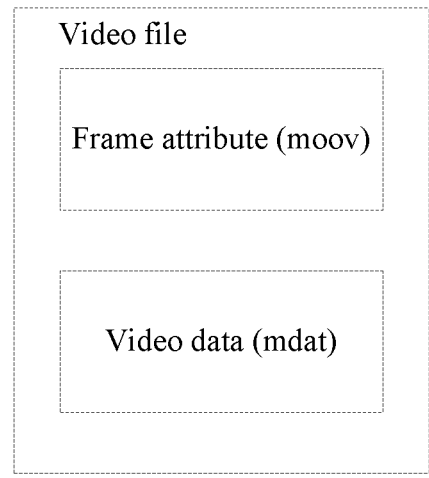
FIG. 1 is a schematic diagram of a storage structure of a video file.

The International Organization for Standardization (ISO)/International Electrotechnical Commission (IEC) 14496-12 standard provides a method for storing video data such as audio and a video. FIG. 1 is a schematic diagram of a storage structure of a video file. As shown in FIG. 1, a video file mainly includes two parts a video frame attribute (moov) and video data (mdat), and such a storage structure is generally referred to as a box, for example, a moov box and an mdat box. When a video is dragged to play, edited, or the like, an index of an I frame corresponding to a target time point of the video needs to be found in the moov box first, and then, video data of the I frame is acquired from the mdat box.

Figure 2:
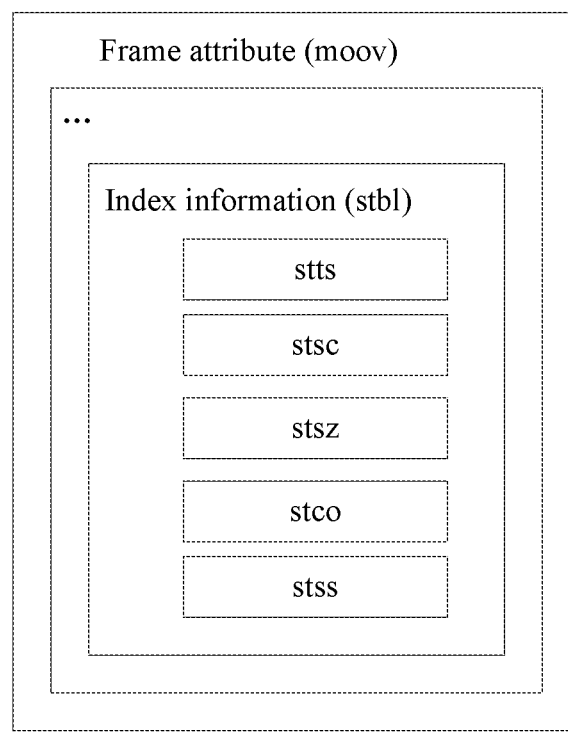
FIG. 2 is a schematic diagram of a storage structure of a video frame attribute.

FIG. 2 is a schematic diagram of a typical storage structure of a video frame attribute. As shown in FIG. 2, a moov box may further include multiple boxes, where a box related to dragging a video to play, editing a video, or the like is an stbl box that stores index information of the video, and the box includes an stts box that stores a correspondence between a time point of the video and a frame number of each frame of the video, an stsc box that stores a correspondence between a frame number and a video chunk in which the frame number is located, an stsz box that stores a frame size, an stco box that stores an offset of each chunk, and an stss box that stores a frame number of a random access frame and a correspondence between a frame number of a common frame in all frames of the video and a frame number of a random access frame. A process of dragging a video to play, editing a video, or the like includes searching the stts box according to a target time point of the video to find a frame number J corresponding to the target time point. If the stss box exists, searching the stss box for a frame number K of a random access frame corresponding to the frame number J, or if the stss box does not exist, determining that K=J, searching, according to the frame number K, the stsc box for a video chunk L in which the random access frame is located, searching the stco box for a location offset M of the chunk L, calculating, according to the frame number K and the stsz box, an offset N that is of the random access frame and is in the chunk L, and acquiring video data of the random access frame from the mdat box according to M and N. Generally, the video starts to be played from a time point of the video. If the time point is exactly corresponding to a random access frame, the video directly starts to be decoded and played from the random access frame after video data of the random access frame is acquired. If the time point is corresponding to a common frame, the video also starts to be played from a random access frame after video data of the random access frame on which decoding of the common frame needs to depend is acquired. Dragging the video to play, editing the video, or the like is completed by means of cooperation of the foregoing boxes.

It may be learned from the foregoing process that, for dragging a conventional video to play, editing a conventional video, or the like, a common frame that depends on a random access frame can be decoded only after the random access frame is found. However, for videos that have a large quantity of identical or similar background areas, a video sequence obtained after the videos includes three types of frames a background frame, a random access frame, and a common frame are encoded, where only the background frame can be independently decoded, and decoding of both the random access frame and the common frame needs to depend on the corresponding background frame. When a video with such a frame structure is dragged to play or edited, a random access frame corresponding to a target time point for dragging or editing may be found first. However, with only the random access frame, decoding cannot be performed, and all frames located before the random access frame need to be searched for one by one in a traversal manner according to frame header data of the random access frame in order to determine a background frame on which decoding of the random access frame depends. However, a traversal method is a searching method with extremely low efficiency, thereby severely reducing efficiency of decoding a video frame.

Figure 3:
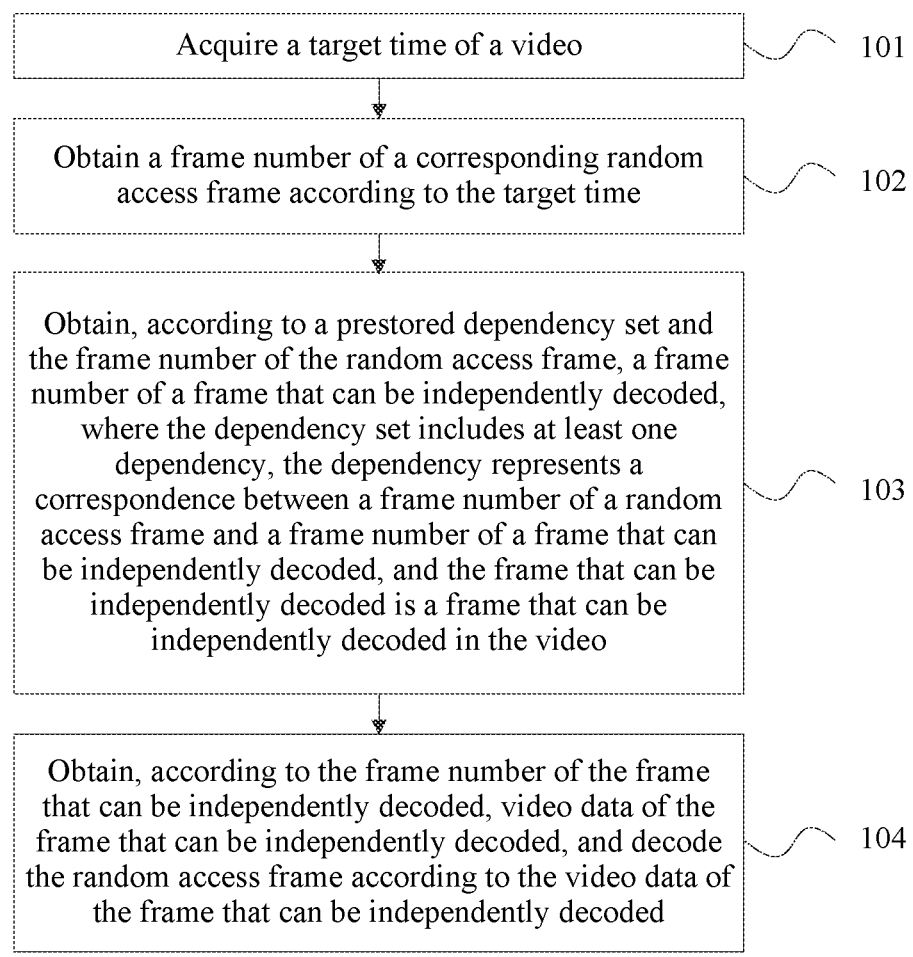
FIG. 3 is a flowchart of a video frame decoding method according to an embodiment of the present disclosure.

FIG. 3 is a flowchart of a video frame decoding method according to an embodiment of the present disclosure. As shown in FIG. 3, the method in this embodiment may include the following steps.

Step 101: Acquire a target time point of a video.

This embodiment may be executed by a video frame decoding apparatus, and the apparatus may be a decoding module of any video player, or may be an independent decoding device. A video sequence generated after optimized encoding is performed on videos that have a large quantity of identical or similar background areas includes three types of frames a background frame, a random access frame, and a common frame, where the background frame can be independently decoded, and decoding of both the random access frame and the common frame needs to depend on the background frame. In this embodiment and subsequent embodiments, the background frame is referred to as a frame that can be independently decoded, which is represented by RAP_I, and the random access frame is represented by RAP_P. When dragging a video to play, editing a video, or the like, a user generally drags a play slider of a player to select a target time point, and the video frame decoding apparatus may acquire the target time point of the video using a location of the play slider.

Step 102: Obtain a frame number of a corresponding random access frame according to the target time point.

Figure 4:
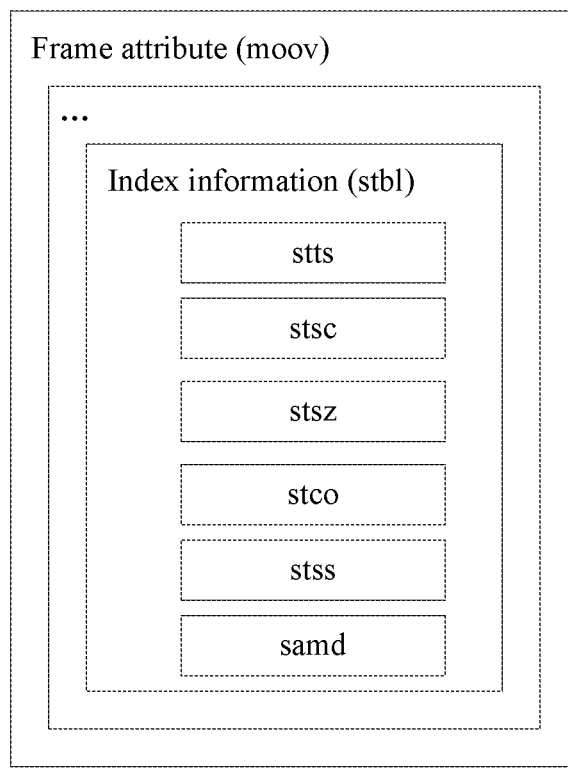
FIG. 4 is a schematic diagram of a storage structure of a video frame attribute according to the present disclosure.

FIG. 4 is a schematic diagram of a storage structure of a video frame attribute according to the present disclosure. As shown in FIG. 4, functions of an stts box, an stsc box, an stsz box, an stco box, and an stss box are the same as those shown in FIG. 2, and details are not described herein again. A difference between FIG. 4 and FIG. 2 lies in that a SampleDependencyBox (samd box) is added, where the samd box is used to store a dependency set in the present disclosure. The dependency set is described in detail in step 103. The video in this embodiment may use the storage structure shown in FIG. 4. A correspondence between a time point of the video and a frame number of each frame of the video is recorded in the video. A frame number corresponding to the target time point may be acquired using the correspondence. Then, it may be determined, according to a frame number, recorded in the video, of a RAP_P frame, whether the frame number corresponding to the target time point is the frame number of the RAP_P frame or a frame number of a common frame. If the frame number is corresponding to the RAP_P frame, the frame number is the frame number of the RAP_P frame corresponding to the target time point, or if the frame number is corresponding to a common frame, a frame number of a RAP_P frame corresponding to the frame number that is obtained according to a correspondence, stored in the video, between a frame number of a common frame in all frames of the video and a frame number of a RAP_P frame is the frame number of the RAP_P frame corresponding to the target time point.

Step 103: Obtain, according to a prestored dependency set and the frame number of the random access frame, a frame number of a frame that can be independently decoded, where the dependency set includes at least one dependency, the dependency represents a correspondence between a frame number of a random access frame and a frame number of a frame that can be independently decoded, and the frame that can be independently decoded is a frame that can be independently decoded in the video.

The dependency set may be prestored, as shown in FIG. 4, in the samd box newly added into the video, or the dependency set may be prestored in an attached file of the video. It should be noted that, in addition to the foregoing two manners, the dependency may be prestored using another storage method commonly used by persons skilled in the art, which is not further limited in the present disclosure. When the video is encoded, three types of frames, namely, a RAP_I frame, a RAP_P frame, and a common frame are generated, and frames of the video are numbered in an encoding order. Therefore, accordingly, in an encoding manner, both a RAP_P frame on which decoding of a common frame depends during decoding and a RAP_I frame on which decoding of the RAP_P frame depends during decoding are determined during encoding. For dragging a video to play, editing a video, or the like, generally, the video starts to be played from a time point of the video. If the time point is exactly corresponding to a RAP_P frame, the video directly starts to be decoded and played from the RAP_P frame after video data of the RAP_P frame is acquired. If the time point is corresponding to a common frame, the video also starts to be played from a RAP_P frame after video data of the RAP_P frame on which decoding of the common frame needs to depend is acquired. However, decoding of the video data of the RAP_P frame also needs to depend on video data of a RAP_I frame, where the video data of the RAP_I frame may be obtained using the foregoing prestored dependency set. After the frame number of the RAP_P frame is obtained by performing step 102, the needed frame number of the RAP_I frame is obtained according to a correspondence, represented by a dependency in the dependency set, between a frame number of a RAP_P frame and a frame number of a RAP_I frame.

Optionally, the dependency set may also be a set of frame numbers of all RAP_I frames of the video, and the needed frame number of the RAP_I frame may be acquired from the set according to a preset rule. Furthermore, all frame numbers that are smaller than a frame number of a to-be-decoded RAP_P frame in the dependency set are found first. Then, a frame number, a difference between which and the frame number of the to-be-decoded RAP_P frame is smallest, is found in the frame numbers, and the frame number is the needed frame number of the RAP_I frame.

Step 104: Obtain, according to the frame number of the frame that can be independently decoded, video data of the frame that can be independently decoded, and decode the random access frame according to the video data of the frame that can be independently decoded.

The video further includes an index of video data corresponding to the frame number of each frame, for example, in the mdat box that stores video data, a storage address is used to represent an index of the video data. Therefore, an address offset of a corresponding frame may be acquired using a frame number, a storage location of the video data may be obtained using the offset, and further the video data is read. The video data in this embodiment is frame data generated after the video is encoded, and specific content is related to a used encoded manner. A reason why a RAP_I frame can be independently decoded is that complete image data, including a pixel, an area, and the like, of the frame is recorded after the frame is encoded. A reason why a RAP_P frame cannot be independently decoded is that encoding of the frame depends on a RAP_I frame and is incremental encoding that is based on the RAP_I frame. Therefore, only incremental data of the frame relative to the RAP_I frame is recorded, and the RAP_P frame can be decoded only after video data of the RAP_I frame and the incremental data of the RAP_P frame are acquired.

According to this embodiment, a dependency set is prestored, a frame number of a frame that can be independently decoded and on which decoding of a random access frame corresponding to a target time point needs to depend can be directly acquired according to the dependency set, and the random access frame is decoded using video data of the frame that can be independently decoded, which implements efficient and fast video decoding.

The following describes in detail the technical solution of the method embodiment shown in FIG. 3 using several specific embodiments.

Embodiment 1

A video uses the storage structure shown in FIG. 4, and a samd box is added into an stbl box, where the samd box stores a dependency set. The dependency set in this embodiment includes a frame number of a RAP_I frame in each dependency and a frame number of a RAP_P frame in each dependency. Further, the dependency set may include an identifier of the video, a quantity of dependencies, a quantity of RAP_I frames in each dependency, and a quantity of RAP_P frames in each dependency.

A specific storage structure of the samd box is as follows (for a uniform description, the present disclosure uses a description method provided in the ISO/IEC 14496-12 standard):

```
aligned(8) class SampleDependencyBox
extends FullBox('samd', version = 0, 0){
unsigned int(32) track_ID;
unsigned int(32) entry_count;
int i;
for(i = 0; i < entry_count; i++){
dependencyEntryBox( );
}
}
aligned(8) class dependencyEntryBox
extends FullBox('deet', version = 0, 0){
unsigned int(32) SampleSize1;
unsigned int(32) SampleSize2;
for(i = 0; i < SampleSize1; i++){
unsigned int(32) sample_num_1;
}
for(i = 0; i < SampleSize2; i++){
unsigned int(32) sample_num_2;
}
}
```

Notes: track_ID represents an identifier of a video, entry_count represents a quantity of dependencies, where a dependency set includes at least one dependency, each dependency represents a correspondence between a frame number of a RAP_P frame and a frame number of a RAP_I frame, each dependency in this embodiment is described using one structure body, and the structure body is described using a dependencyEntryBox (deet box), SampleSize1 represents a quantity of RAP_I frames in each dependency, SampleSize2 represents a quantity of RAP_P frames in each dependency, sample_num_1 represents a frame number of a RAP_I frame in each dependency, and sample_num_2 represents a frame number of a RAP_P frame in each dependency.

Figure 5:
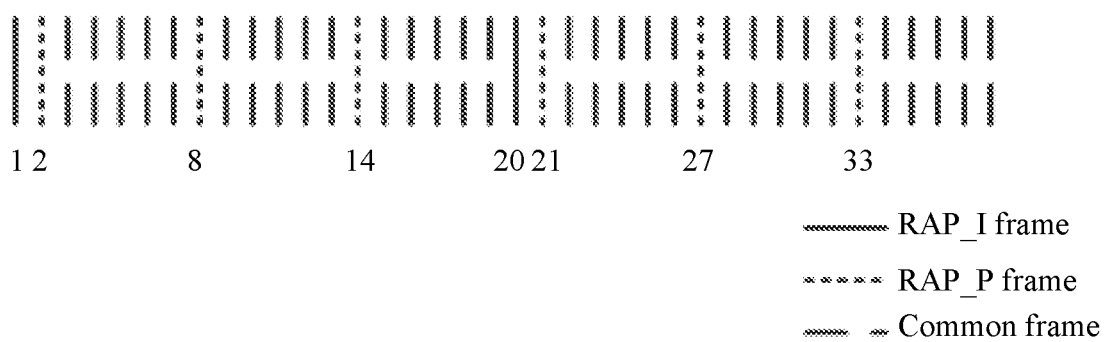
FIG. 5 is a schematic diagram of a video frame structure.

For example, FIG. 5 is a schematic diagram of a video frame structure. As shown in FIG. 5, there are two RAP_I frames whose frame numbers are 1 and 20, and there are six RAP_P frames whose frame numbers are 2, 8, 14, 21, 27, and 33. Decoding of the RAP_P frames whose frame numbers are 2, 8, and 14 depends on the RAP_I frame whose frame number is 1, and decoding of the RAP_P frames whose frame numbers are 21, 27, and 33 depends on the RAP_I frame whose frame number is 20. According to the foregoing description method, the dependency set in this embodiment is as follows.

```
samd
  track_ID = 1 (the identifier of the video)
  entry_count = 2 (the quantity of dependencies)
  deet (the first dependency)
    SampleSize1 = 1 (the quantity of RAP_I frames)
    SampleSize2 = 3 (the quantity of RAP_P frames)
    [1] (the frame number of the RAP I frame)
    [2, 8, 14] (the frame numbers of the RAP_P frames)
  deet (the second dependency)
    SampleSize1 = 1 (the quantity of RAP_I frames)
    SampleSize2 = 3 (the quantity of RAP_P frames)
    [20] (the frame number of the RAP I frame)
    [21, 27, 33] (the frame numbers of the RAP_P frames)
```

Based on the foregoing storage structure, according to the samd box, a video frame decoding apparatus in this embodiment finds a frame number of a RAP_P frame, and determines whether the frame number belongs to the first dependency or the second dependency. A frame number of a RAP_I frame in a dependency to which the frame number belongs is a frame number of a frame that can be independently decoded and on which decoding of the RAP_P frame needs to depend. Therefore, for dragging a video to play, editing a video, or the like, video frame decoding steps include the following steps.

(1) Query an stts box according to a target time point of the video to find a frame number J corresponding to the target time point.

(2) Search an stss box for a frame number K of a RAP_P frame corresponding to the frame number J. If the frame number J is corresponding to the RAP_P frame, K=J.

(3) Obtain a frame number R of a RAP_I frame according to a dependency set stored in a samd box and the frame number K.

(4) Acquire, according to an stsc box, a number L of a chunk in which the frame number R is located.

(5) Acquire an offset M of the chunk L according to an stco box.

(6) Calculate, according to an stsz box, an offset N that is of the frame number R and is in the chunk L.

(7) Acquire video data of the RAP_I frame whose frame number is R from an mdat box according to M and N.

(8) Then, acquire, according to the method of step (4) to step (7), incremental video data of the RAP_P frame whose frame number is K.

(9) Decode the RAP_P frame with reference to the video data of the RAP_I frame and the incremental video data of the RAP_P frame.

Embodiment 2

A video still uses the storage structure shown in FIG. 4, and a samd box is added into an stbl box, where the samd box stores a dependency set. The dependency set in this embodiment includes frame numbers of RAP_I frames in all dependencies. Further, the dependency set may include an identifier of the video and a quantity of dependencies.

A specific storage structure of the samd box is as follows.

```
aligned(8) class SampleDependencyBox
extends FullBox('samd', version = 0, 0){
  unsigned int(32) track_ID;
  unsigned int(32) entry_count;
  int i;
  for(i = 0; i < entry_count; i++){
    unsigned int(32) sample_num;
  }
}
```

Notes: track_ID represents an identifier of a video, entry_count represents a quantity of dependencies, and sample_num represents frame numbers of RAP_I frames in all dependencies.

The video frame structure shown in FIG. 5 is still used as an example, and the dependency set in this embodiment is as follows.

```
samd
  track_ID = 1 (the identifier of the video)
  entry_count = 2 (the quantity of dependencies)
  [1, 20] (the frame numbers of the RAP_I frames in all the dependencies)
```

Based on the foregoing storage structure, according to the samd box, a video frame decoding apparatus in this embodiment finds a frame number of a RAP_I frame on which decoding of a RAP_P frame needs to depend. The frame number of the RAP_I frame is a frame number that is smaller than a frame number of the RAP_P frame in the dependency set, where a difference between the frame number of the RAP_I frame and the frame number of the RAP_P frame is the smallest. In this embodiment, frame numbers of RAP_P frames are 2, 8, 14, 21, 27, and 33, and frame numbers of RAP_I frames are 1 and 20. According to the foregoing matching rule, a RAP_I frame whose frame number is smaller than 2, 8, and 14 is only the RAP_I frame whose frame number is 1, and therefore, decoding of the RAP_P frames whose frame numbers are 2, 8, and 14 depends on the RAP_I frame whose frame number is 1. RAP_I frames whose frame numbers are smaller than 21, 27, and 33 are the RAP_I frames whose frame numbers are 1 and 20. However, differences between 20 and 21, 27, and 33 are smaller. Therefore, decoding of the RAP_P frames whose frame numbers are 21, 27, and 33 depends on the RAP_I frame whose frame number is 20.

Video frame decoding steps in this embodiment are the same as those in Embodiment 1, and only a storage structure of a dependency set prestored in a samd box and a method for obtaining a RAP_I frame are different.

Embodiment 3

A video uses the storage structure shown in FIG. 2. In this embodiment, an stss box is extended, and a storage structure of a dependency set is added to an original storage structure, for example, a storage structure of an original SyncSampleBox (stss box) is as follows.

```
aligned(8) class SyncSampleBox
extends FullBox('stss', version = 0, 0){
unsigned int(32) entry_count;
int i;
for(i = 0; i < entry_count; i++){
unsigned int(32) sample_number;
}
}
```

A storage structure of an extended stss box in this embodiment is as follows.

```
aligned(8) class SyncSampleBox
extends FullBox('stss', version = 1, 0){
unsigned int(32) entry_count;
int i;
for(i = 0; i < entry_count; i++){
unsigned int(32) sample_number;
}
unsigned int(32) entry_count_1;
int j;
for(j = 0; j < entry_count_1; j++){
unsigned int(32) sample_num_1;
}
}
```

The storage structure of the dependency set in Embodiment 2 is added to the end of the storage structure of the original stss box. In this embodiment, for dragging a video to play, editing a video, or the like, video frame decoding steps include the following steps.

(1) Query an stts box according to a target time point of the video to find a frame number J corresponding to the target time point.

(2) Search an stss box for a frame number K of a RAP_P frame corresponding to the frame number J. If the frame number J is corresponding to the RAP_P frame, K=J.

(3) Obtain a frame number R of a RAP_I frame according to a dependency set stored in an stss box and the frame number K.

(4) Acquire, according to an stsc box, a number L of a chunk in which the frame number R is located.

(5) Acquire an offset M of the chunk L according to an stco box.

(6) Calculate, according to an stsz box, an offset N that is of the frame number R and is in the chunk L.

(7) Acquire video data of the RAP_I frame whose frame number is R from an mdat box according to M and N.

(8) Then, acquire, according to the method of step (4) to step (7), incremental video data of the RAP_P frame whose frame number is K.

(9) Decode the RAP_P frame with reference to the video data of the RAP_I frame and the incremental video data of the RAP_P frame.

Embodiment 4

In this embodiment, a dependency set is separately stored, and the dependency set is stored in an attached file of a video, for example, the dependency set is stored in an a.index file. A storage structure 700 that is of the dependency set and is in the attached file in this embodiment is shown in FIG. 7.

Figure 7:
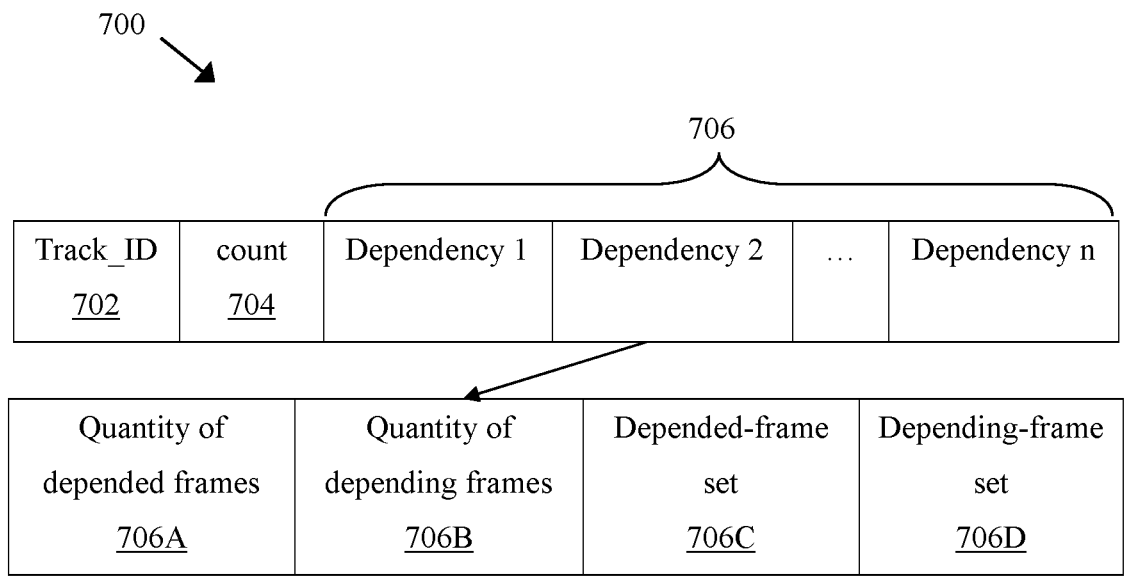
FIG. 7 is a schematic diagram of a storage structure of a dependency set according to an embodiment of the disclosure.

In FIG. 7, Track ID 702 represents an identifier of a video, count 704 represents a quantity of dependencies, and dependency n 706 (for example, Dependency 1, Dependency 2, Dependency n) represents an index of the $n^{th}$ dependency.

Each dependency is represented using the following quadruple. Quantity of depended frames 706A, representing a quantity of RAP_I frames in each dependency. Quantity of depending frames 706B, representing a quantity of RAP_P frames in each dependency. Depended-frame set 706C, representing a frame number of a RAP_I frame in each dependency, and depended-frame set 706D, representing a frame number of a RAP_P frame in each dependency.

Figure 8:
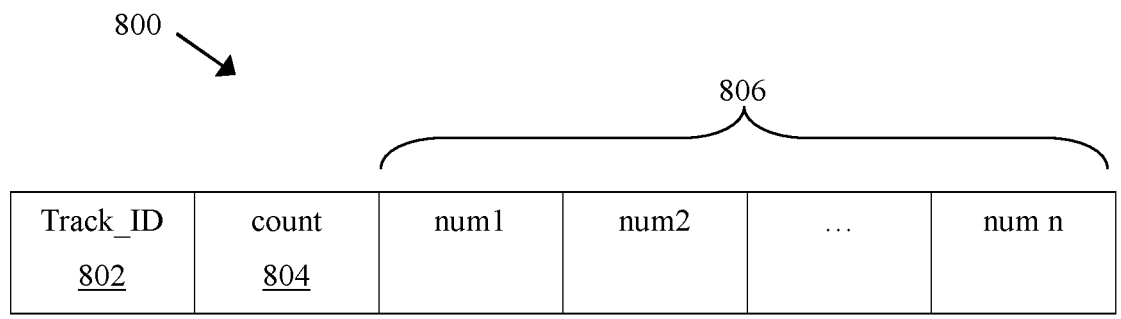
FIG. 8 is a schematic diagram of a storage structure of a dependency set according to an embodiment of the disclosure.

Optionally, the storage structure 800 that is of the dependency set and is in the attached file in this embodiment is shown in FIG. 8.

In FIG. 8, Track_ID 802 represents an identifier of a video, count 804 represents a quantity of dependencies, and num n 806 represents a frame number of a RAP_I frame in the $n^{th}$ dependency.

It is assumed that the video is a.mp4, and an attached file generated using either of the foregoing storage structures is a.index. In this embodiment, for dragging a video to play, editing a video, or the like, video frame decoding steps include the following steps.

(1) Query an stts box according to a target time point of the video to find a frame number J corresponding to the target time point.

(2) Search an stss box for a frame number K of a RAP_P frame corresponding to the frame number J. If the frame number J is corresponding to the RAP_P frame, K=J.

(3) Obtain a frame number R of a RAP_I frame according to a dependency set stored in a.index and the frame number K.

(4) Acquire, according to an stsc box, a number L of a chunk in which the frame number R is located.

(5) Acquire an offset M of the chunk L according to an stco box.

(6) Calculate, according to an stsz box, an offset N that is of the frame number R and is in the chunk L.

(7) Acquire video data of the RAP_I frame whose frame number is R from an mdat box according to M and N.

(8) Then, acquire, according to the method of step (4) to step (7), incremental video data of the RAP_P frame whose frame number is K.

(9) Decode the RAP_P frame with reference to the video data of the RAP_I frame and the incremental video data of the RAP_P frame.

According to the foregoing method embodiments, a dependency set is prestored, a frame number of a frame that can be independently decoded and on which decoding of a random access frame corresponding to a target time point needs to depend can be directly acquired according to the dependency set, and the random access frame is decoded using video data of the frame that can be independently decoded, which implements efficient and fast video decoding.

Figure 6:
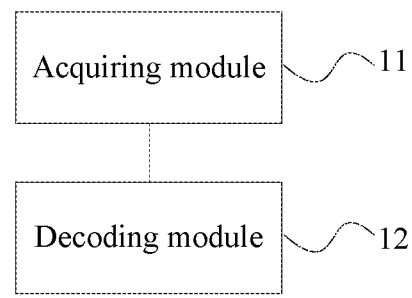
FIG. 6 is a schematic structural diagram of a video frame decoding apparatus according to an embodiment of the present disclosure.

FIG. 6 is a schematic structural diagram of a video frame decoding apparatus according to an embodiment of the present disclosure. As shown in FIG. 6, the apparatus in this embodiment may include an acquiring module 11 and a decoding module 12. The acquiring module 11 is configured to acquire a target time point of a video, obtain a frame number of a corresponding random access frame according to the target time point, and obtain, according to a prestored dependency set and the frame number of the random access frame, a frame number of a frame that can be independently decoded, where the dependency set includes at least one dependency, the dependency represents a correspondence between a frame number of a random access frame and a frame number of a frame that can be independently decoded, and the frame that can be independently decoded is a frame on which decoding of the random access frame needs to depend. The decoding module 12 is configured to obtain, according to the frame number of the frame that can be independently decoded, video data of the frame that can be independently decoded, and decode the random access frame according to the video data of the frame that can be independently decoded.

The apparatus in this embodiment may be configured to execute the technical solution in the method embodiment shown in FIG. 3. Implementation principles and technical effects in this embodiment are similar to those in the method embodiment, and details are not described herein again.

The acquiring module 11 is further configured to obtain, according to the prestored dependency set and the frame number of the random access frame, the frame number of the frame that can be independently decoded, where the dependency set includes frame numbers of all frames, which can be independently decoded, of the video, and the obtained frame number of the frame that can be independently decoded is a frame number that is smaller than the frame number of the random access frame in the dependency set, where a difference between the frame number that can be independently decoded and the frame number of the random access frame is the smallest.

Further, the dependency set is prestored in the video, or the dependency set is prestored in an attached file of the video.

The acquiring module 11 is further configured to acquire the dependency set from the video or the attached file.

Further, the video includes video index information and video data, and the video index information includes a correspondence between a time point of the video and a frame number of each frame of the video, frame numbers of all random access frames, and a correspondence between a frame number of a common frame in all the frames and a frame number of a random access frame.

The acquiring module 11 is further configured to obtain, according to the correspondence between a time point of the video and a frame number of each frame of the video, a frame number corresponding to the target time point; and if the frame number corresponding to the target time point is found in the frame numbers of all the random access frames, determine that the frame number of the random access frame corresponding to the target time point is the frame number corresponding to the target time point, or if the frame number corresponding to the target time point is not found in the frame numbers of all the random access frames, determine that the frame number corresponding to the target time point is a frame number of a common frame, and obtain, according to the correspondence between a frame number of a common frame in all the frames and a frame number of a random access frame, the frame number of the random access frame corresponding to the target time point.

Further, the video index information further includes an index of video data corresponding to the frame number of each frame.

The decoding module 12 is further configured to query the video index information according to the frame number of the frame that can be independently decoded, to obtain an index of the video data of the frame that can be independently decoded, and acquire, according to the index, the video data of the frame that can be independently decoded.

Persons of ordinary skill in the art may understand that all or some of the steps of the method embodiments may be implemented by a program instructing related hardware. The program may be stored in a computer-readable storage medium. When the program runs, the steps of the method embodiments are performed. The foregoing storage medium includes any medium that can store program code, such as a read-only memory (ROM), a random-access memory (RAM), a magnetic disk, or an optical disc.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof. However, these modifications or replacements do not make the essence of corresponding technical solutions depart from the scope of the technical solutions in the embodiments of the present disclosure.

The invention claimed is:

1. A video frame decoding method, comprising:
acquiring a target time point of a video;
obtaining a frame number of a first frame corresponding to the target time point, wherein the first frame is a random access frame other than an I frame, and wherein the video comprises video index information comprising:
a first correspondence between a time point of the video and a plurality of first frame numbers of each frame of the video;
a plurality of second frame numbers of all random access frames in the video; and
a second correspondence between a frame number of a common frame of the video and the frame number of the first frame, and wherein obtaining the frame number of the first frame comprises:
obtaining any frame number that corresponds to the target time point based on the first correspondence;
determining that the frame number of the first frame corresponds to the target time point when the any frame number that corresponds to the target time point is found in the second frame numbers;
determining that the any frame number that corresponds to the target time point is the frame number of the common frame when the any frame number that corresponds to the target time point is not found in the second frame numbers; and
obtaining the frame number of the first frame that corresponds to the target time point based on the second correspondence when the frame number of the first frame that corresponds to the target time point is not found in the second frame numbers;
obtaining a frame number of a second frame based on a prestored dependency set and the frame number of the first frame, wherein decoding of the first frame depends on the second frame, wherein the second frame is configured to be decoded without depending on another frame, wherein the prestored dependency set comprises a quantity of dependencies in the video, and wherein at least one of the dependencies represents a third correspondence between the frame number of the first frame and the frame number of the second frame
obtaining video data of the second frame based on the frame number of the second frame; and
decoding the first frame based on the video data of the second frame.

2. The video frame decoding method of claim 1, wherein the frame number of the second frame is the frame number that is smaller than the frame number of the first frame in the prestored dependency set.

3. The video frame decoding method of claim 1, wherein the prestored dependency set is prestored in the video, and wherein the video frame decoding method further comprises acquiring the prestored dependency set from the video.

4. The video frame decoding method of claim 1, wherein the prestored dependency set is prestored in an attached file of the video, and wherein the video frame decoding method further comprises acquiring the prestored dependency set from the attached file.

5. The video frame decoding method of claim 1, wherein the video index information further comprises an index of video data corresponding to the first frame numbers, and wherein the video frame decoding method further comprises:
  querying the video index information based on the frame number of the second frame to obtain an index of the video data of the second frame; and
  acquiring the video data of the second frame based on the index of the video data of the second frame.

6. A video frame decoding apparatus, comprising:
  a processor; and
  a non-transitory computer-readable storage medium coupled to the processor and storing programming instructions, wherein the programming instructions instruct the processor to:
  acquire a target time point of a video;
  obtain a frame number of a first frame corresponding to the target time point, wherein the first frame is a random access frame other than an I frame, and wherein the video comprises video index information comprising:
    a first correspondence between a time point of the video and a plurality of first frame numbers of each frame of the video;
    a plurality of second frame numbers of all random access frames in the video; and
    a second correspondence between a frame number of a common frame of the video and the frame number of the first frame, and wherein obtaining the frame number of the first frame comprises:
      obtaining any frame number that corresponds to the target time point based on the first correspondence;
      determining that the frame number of the first frame corresponds to the target time point when the any frame number that corresponds to the target time point is found in the second frame numbers;
      determining that the any frame number is the frame number that corresponds to the target time point is the frame number of the common frame when the any frame number that corresponds to the target time point is not found in the second frame numbers; and
      obtaining the frame number of the first frame that corresponds to the target time point based on the second correspondence when the frame number of the first frame that corresponds to the target time point is not found in the second frame numbers of all the random access frames;
  obtain a frame number of a second frame based on a prestored dependency set and the frame number of the first frame, wherein decoding of the first frame depends on the second frame, wherein the second frame is configured to be decoded without depending on another frame, wherein the prestored dependency set comprises a quantity of dependencies in the video, wherein at least one of the dependencies represents a third correspondence between the frame number of the first frame and the frame number of the second frame, and wherein the third correspondence represents that decoding of the first frame depends on the second frame;
  obtain video data of the second frame based on the frame number of the second frame; and
  decode the first frame based on the video data of the second frame.

7. The video frame decoding apparatus of claim 6, wherein the prestored dependency set comprises frame numbers of all frames of the video that can be decoded without depending on another frame, and wherein the frame number of the second frame is the frame number that is smaller than the frame number of the first frame in the dependency set.

8. The video frame decoding apparatus of claim 6, wherein the prestored dependency set is prestored in the video, and wherein the programming instructions further instruct the processor to acquire the prestored dependency set from the video.

9. The video frame decoding apparatus of claim 6, wherein the prestored dependency set is prestored in an attached file of the video, and wherein the programming instructions further instruct the processor to acquire the prestored dependency set from the attached file.

10. The video frame decoding apparatus of claim 6, wherein the video index information further comprises an index of video data corresponding to the first frame numbers, and wherein the programming instructions further instruct the processor to:
  query the video index information based on the frame number of the second frame to obtain an index of the video data of the second frame; and
  acquire the video data of the second frame based on the index of the video data of the second frame.

11. The video frame decoding apparatus of claim 6, wherein the prestored dependency set is stored in a box that stores the first, the second, and the third correspondences, a first field corresponding to the second frame numbers, and a second field corresponding to a plurality of third frame numbers of frames of the video that are configured to be decoded without depending on another frame.

12. The video frame decoding apparatus of claim 11, wherein a storage structure of the box is:

```
aligned(8) class SampleDependencyBox
extends FullBox('samd', version = 0, 0){
unsignedint(32) track_ID;
unsignedint(32) entry_count;
int i;
for(i = 0; i < entry_count; i++){
dependencyEntryBox( );
}
}
aligned(8)class dependencyEntryBox
extends FullBox('deet', version = 0, 0){
unsigned int(32) SampleSize1;
unsigned int(32) SampleSize2;
for(i = 0; i < SampleSize1; i++){
unsigned int(32) sample_num_1;
}
for(i = 0; i < SampleSize2; i++){
```

```
unsigned int(32) sample_num_2;
    }
}.
```

13. A video frame decoding apparatus, comprising:
a processor; and
a non-transitory computer-readable storage medium coupled to the processor and storing programming instructions by the processor, wherein the programming instructions instruct the processor to:
acquire a target time point of a video;
query a first box based on the target time point to acquire a first frame number corresponding to the target time point, wherein the first box is a time-to-sample (stts) box, and wherein the video comprises video index information comprising:
a first correspondence between a time point of the video and a plurality of first frame numbers of each frame of the video;
a plurality of second frame numbers of all random access frames in the video, and
a second correspondence between a frame number of a common frame of the video and the first frame number, wherein querying the first box to acquire the first frame number comprises:
obtaining any frame number that corresponds to the target time point based on the first correspondence;
determining that the first frame number is the frame number that corresponds to the target time point when the any frame number that corresponds to the target time point is found in the second frame numbers;
determining that the any frame number that corresponds to the target time point is the frame number of the common frame when the any frame number that corresponds to the target time point is not found in the second frame numbers; and
obtaining the first frame number that corresponds to the target time point based on the second correspondence when the first frame number that corresponds to the target time point is not found in the frame numbers of all the random access frames;
search a second box for a second frame number of a first frame of the video corresponding to the first frame number, wherein decoding of the first frame depends on a second frame configured to be decoded without depending on another frame, wherein the first frame is a random access frame other than an I-frame, and wherein the second box is a sync sample (stss) box;
obtain, by searching a third box distinct from the first and second boxes based on the second frame number of the first frame, a third frame number of the second frame, wherein the third box stores a prestored dependency set that comprises:
a quantity of dependencies in the video;
a first quantity of random access frames in each of the dependencies; and
a second quantity of frames in each of the dependencies;
obtain, based on the third frame number of the second frame, video data of the second frame; and
decode the first frame based on the video data of the second frame.

14. The video frame decoding apparatus of claim 13, wherein at least one of the dependencies represents a third correspondence between the second frame number of the first frame and the third frame number of the second frame.

15. The video frame decoding apparatus of claim 14, wherein the third correspondence represents that decoding of the first frame depends on the second frame.

16. The video frame decoding apparatus of claim 15, wherein each of the second quantity of frames is configured to be decoded without depending on another frame.

17. The video frame decoding method of claim 1, wherein the prestored dependency set further comprises:
a first quantity of random access frames in each of the dependencies; and
a second quantity of frames in each of the dependencies, wherein each of the second quantity of frames is configured to be decoded without depending on another frame.

18. The video frame decoding method of claim 1, wherein the third correspondence represents that decoding of the first frame depends on the second frame.

19. The video frame decoding apparatus of claim 6, wherein the prestored dependency set further comprises:
a first quantity of random access frames in each of the dependencies; and
a second quantity of frames in each of the dependencies, wherein each of the second quantity of frames is configured to be decoded without depending on another frame.

20. The video frame decoding apparatus of claim 6, wherein the third correspondence represents that decoding of the first frame depends on the second frame.

* * * * *